Feb. 8, 1966  H. H. PASE  3,233,625
MAGNETICALLY OPERATED VALVE
Filed Nov. 22, 1963

INVENTOR
HUGH H. PASE
BY
*Steward + Steward*
his ATTORNEYS.

United States Patent Office 3,233,625
Patented Feb. 8, 1966

3,233,625
MAGNETICALLY OPERATED VALVE
Hugh H. Pase, Cheshire, Conn., assignor to The Houston Company, Cheshire, Conn., a corporation of Connecticut
Filed Nov. 22, 1963, Ser. No. 325,653
5 Claims. (Cl. 137—416)

This invention relates to magnetic devices, and it relates more particularly to magnetically operated valves in which there is no mechanical connection with the valve-closing member for actuating the valve.

Magnetically operated valves have been proposed heretofore in which the valve is opened or closed by means of the attraction or repulsion of magnets. In such prior valves where the closing member moves linearly between its open and closed positions, the magnets have been so arranged as to continuously exert a force on the closing member into its closed position. This type of magnetically operated valve, however, is not suitable for some purposes.

It is an object of the present invention to provide a magnetically actuated valve wherein the valve-closing member is urged into both its open and closed positions by the repulsion of like magnetic poles. Another object of this invention is to provide a simple, inexpensive and reliable means by which to magnetically operate a valve.

In valves according to the invention, a valve-closing member, such as an elongated plug or spherical ball, moves into and out of closing relation with its valve seat along a limited path of movement. Actuation of the valve-closing member is accomplished by means of a magnetic toggle consisting of a driven magnet, most desirably a permanent bar magnet, carried by the valve-closing member and a driving magnet, which is preferably an annular magnet or the equivalent, disposed adjacent the driven magnet and mounted with respect thereto so that it is movable along the path of movement of the valve-closing member relative to said driven magnet. In situations where the driving magnet is annular or ring-shaped, it is disposed so that it encompasses the valve-closing member and moves within the magnetic field of the driven magnet. On the other hand, if a series of bar magnets are used, instead of a ring magnet, they are disposed co-axially about, and in effect encompasses the valve-closing member. In that case the ring of bar magnets move together as a unit relative to the valve-closing member within the magnetic field of the driven magnet.

In order to obtain the toggle action on the valve-closing member, the driving magnet is mounted so that it travels beyond the driven magnet in both directions, such that the range of movement of the driven magnet is completely spanned or encompassed within the movement of the driving magnet. In addition the poles of the magnets are disposed so that the driven magnet and valve-closing member on which it is carried are repelled in one direction by the driving magnet along its path of movement when the driving magnet is at one of its limits of movement. Furthermore, when the driving magnet is moved to its other extreme, the driven magnet and valve-closing member are repelled in the opposite direction, thereby producing the desired toggle action by which the valve is actuated and positively urged into its open or closed positions depending on the position of the driving magnet. Various arrangements of the two magnets will produce this toggle action, examples of which will be given hereinafter.

One of the advantages of using the magnetically actuated device of the present invention is in reducing or eliminating premature actuation of a float valve due to partial movement of the float. In conventional float valves such movement of the float may actuate the valve and thereby cause a malfunction. However, use of the magnetic toggle valve of the present invention helps prevent premature opening or closing of the valve and also facilitates precise sensing of liquid level.

Another important advantage of the invention is that by disposing the magnets axially of the valve-closing member an exceedingly simple and compact means is provided for actuating the valve. This is particularly true where the available space is limited, as for example when a float valve must be disposed vertically through the top of a tank to be filled to within an inch or so of the top.

These and other advantages and objects of the invention will become more apparent from the following description of one particular embodiment of the invention which is illustrated in the accompanying drawings. It will be understood that various other arrangements and specific applications for the invention may be employed without departing from the scope of the invention as defined in the claims appended hereto.

Figure 1:
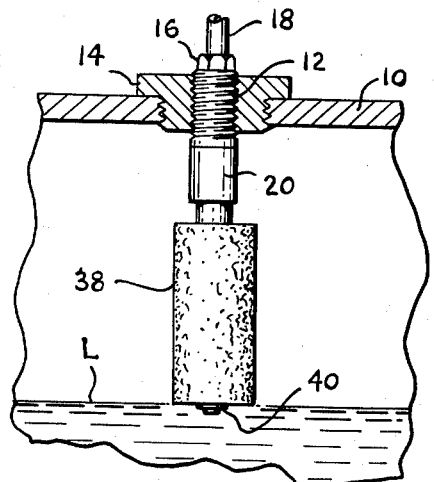
FIG. 1 is a view in elevation of a float-valve assembly according to the present invention shown mounted in the top of a tank.
Figure 4:
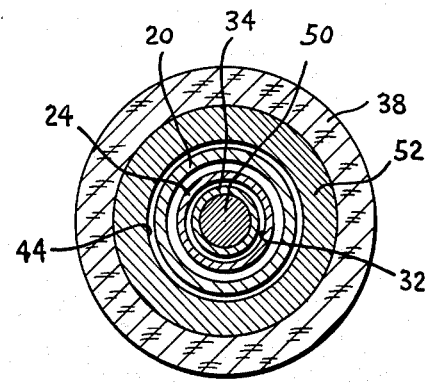
FIG. 4 is a cross-section taken on the line 4—4 in FIG. 3.

The valve assembly shown in the drawings for illustrative purposes only is a pilot valve similar to that described in my co-pending application, Serial No. 195,613 filed May 17, 1962, in which a float is used to determine when the tank is full and to actuate an automatic cut-off mechanism at the fill-pipe in order to stop the flow into the tank, thereby preventing over-filling while at the same time permitting the tank to be filled to capacity. The valve assembly of the present invention is designed primarily for mounting through the top 10 of a liquid container such as a fuel tank.

An inlet housing 12, having a passage 13, is threaded into a collar 14, which in turn is mounted in a threaded hole provided at a suitable place in the top 10 of the tank. The outer end of housing 12 is tapped for a pipe fitting 16, by means of which a line 18 to the nozzle coupling (not shown) at the fill-pipe is connected to the pilot valve. The inner end of inlet housing 12 is reduced in diameter and externally threaded in order to receive the internally threaded portion 19 of a cylindrical valve-housing 20.

Within the valve chamber 22 of valve-housing 20 is rigidly mounted a cylindrical valve-guide 24, which is smaller in diameter than chamber 22 and extends longitudinally thereof in spaced relation to the walls of said chamber. Valve-guide 24 is supported within the valve-housing 20 by its upper flanged end 26, which fits within the internally threaded portion 19 of housing 20 and rests against the upwardly facing shoulder 28 on the inner wall of valve-housing 20 between the valve chamber 22 and the threaded portion 19. When the inlet housing 12 is turned down tightly into valve-housing 20, the inner end of housing 12 engages the flange 26 of valve-guide 24, holding it rigidly against the shoulder 28.

The vertical section of a T-shaped passage 30 in the upper end of valve-guide 24 coincides with the lower end of passage 13 in the inlet housing 12, while the horizontal portion of passage 30 opens at both ends into the valve chamber 22 just below flange 26. Disposed within a cylindrical socket 32 at the opposite end of valve-guide 24 is a movable valve-closing member 34 which reciprocates between its open position shown in FIG. 2 and the closed position shown in FIG. 3. Valve-closing member 34 is a cylindrical plug fitting relatively loosely within the socket 32 and having a conical end adapted to seat within the open end 35 of a rigid outlet tube 36 mounted in the bottom of valve-housing 20.

Figure 2:
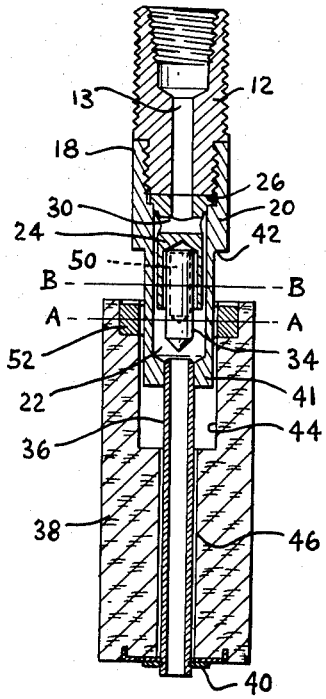
FIG. 2 is a central longitudinal section through the float-valve assembly shown in FIG. 1.

As shown in FIG. 2, outlet tube 36 extends a substantial distance below valve-housing 20 for supporting and axially guiding a cylindrical float 38 which slides vertically thereon within predetermined limits. A split-washer 40, fitting in a circumferential groove adjacent the lower end of tube 36, limits the downward travel of float 38. The upper portion of float 38 surrounds the lower portion 41 of valve-housing 20 which is reduced in diameter to form a downwardly facing annular shoulder 42 for limiting the upward movement of the float.

Figure 3:
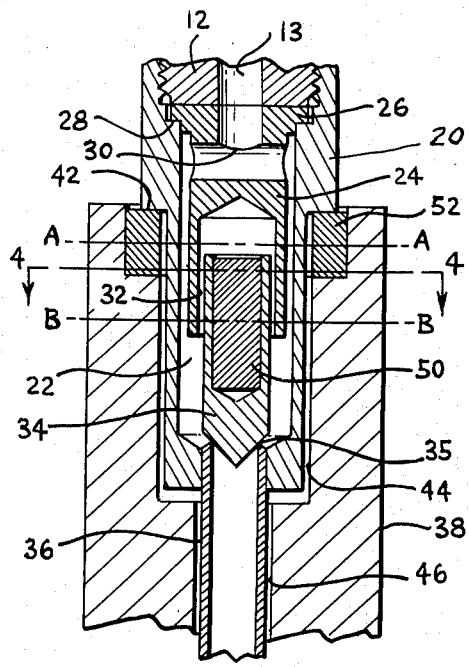
FIG. 3 is an enlarged view similar to FIG. 2 but partially broken away and showing the parts in a different position from that shown in FIG. 2.

An enlarged cylindrical recess 44 is provided in the upper end of float 38 co-axialy with a passage 46, which extends to the lower end of the float and through which the outlet tube 36 passes. Recess 44 is slightly larger in diameter than the outside diameter of the lower portion 41 of the valve-housing and is also deeper than the vertical dimension of portion 41 so that the upper end of float 38 can engage the stop-shoulder 42, as shown in FIG. 3. It will be noted therefore, that the limits of travel of float 38 are fixed by the washer 40 at the lower end of tube 36 and by the stop-shoulder 42 in the opposite direction.

All the major parts of the valve thus far mentioned except the valve-closing member are made of non-magnetic material so as not to affect the operation of the magnetic means by which the valve-closing member 34 is shifted into and out of closing position. A permanent bar magnet 50 is embedded in valve-closing member 34 with its axis coinciding with the longitudinal axis of the valve-closing member. In addition, an annular magnet 52, having an inside diameter equal to the diameter of recess 44, is mounted adjacent the upper end of float 38 co-axially therewith. The magnetic poles of magnets 50 and 52 are arranged such that the magnets repel each other axially, causing valve-closing member 34 to be lifted to its open position when the float is at its lower limit (FIG. 2) and to be driven down into closing position when the float valve is at its upper limit (FIG. 3).

In the specific arrangement of magnets 50 and 52 found to be most desirable in the valve illustrated, the poles of the bar magnet 50 are disposed in the same axial direction as the poles of the annular magnet 52. In other words, with the magnetic axis of the annular magnet 52 extending perpendicular to the plane of the annulus and assuming the magnetic pole adjacent the upper side of the annulus to be north-seeking, then the pole at the upper end of the bar magnet 50 is likewise north-seeking. On the other hand, if the poles of the magnet 52 are reversed, the poles of the magnet 50 must also be reversed.

It will then be noted that by limiting the vertical movement of the valve-closing member 34 between the closed end of the recess 32 in the guide-member 24 and its valve seat 35, the direction of the magnetic forces exerted between magnets 50 and 52 along their axes will be reversed in a toggle-like action as the float moves from one of its limits of travel to the other. Thus, referring to FIG. 2, when the float 38 is at its lower limit of travel, as for example when the liquid level L (FIG. 1) in the tank is below the float, the magnetic forces between magnets 50 and 52 will lift the valve-closing member 34 to the position shown in FIG. 2. It will be noted that in this position of the magnets, the median plane A—A, passing through the center of the magnetic field of magnet 52 and perpendicular to its axis, is located below a similar plane B—B through the center of magnet 50. As the float is lifted by the liquid in the tank when the tank is full, the magnet 52 is raised until its median plane A—A crosses the median plane B—B of magnet 50, whereupon the resultant axial forces between the magnets are reversed, causing valve-closing member 34 to drop down into closing relation with the valve-seat 35.

The upper limits of travel of the two magnets are so arranged that when the float 38 engages the stop-shoulder 42, the plane A—A of magnet 52 is located above the plane B—B of magnet 50 when the valve-closing member 34 engages the closed end of socket 32 in the valve-guide 24. On the other hand, stop-shoulder 42 should be positioned so that magnet 52 cannot move out of the magnetic field of magnet 50 in the valve-member where it would not longer exert a force on the valve-closing member when the latter moves into closing relation with the valve-seat 35.

Similarly, the lower limits of travel of magnets 50 and 52 are arranged so that when the float engages the stop-washer 40 as shown in FIG. 2, the median plane A—A of magnet 52 is located below the median plane B—B of magnet 50 when the valve-closing member is seated (FIG. 3). It will be seen, therefore, that in order to obtain the toggle action of the repelling forces of magnets 50 and 52, it is essential that the limits of travel of the outer ring magnet 52 span those of the bar magnet 50 in the valve-closing member. It will also be noted that no movement of the valve-closing member takes place until the median plane of the magnet 52 crosses that of the magnet 50, whereupon the valve-closing member is snapped quickly and positively into its opposite position. Thus, the float 38 must be moved almost to its limit of travel before the valve is actuated, thereby providing precise operation of the valve.

The interaction of the magnetic fields of the two magnets not only provides the toggle action for actuating valve-closing member 34 but also helps to maintain this member aligned with its seat 35, thereby ensuring that it properly seats and does not become cocked within the valve chamber 22. Furthermore, this tendency of the valve-closing member to align itself axially makes it possible to increase the size of the socket 32 in valve-guide 24 relative to valve-closing member 34 in order to reduce the dash-pot effect of the valve-guide, while at the same time to shield the valve-closing member against the flow of fluid through the valve. In that connection, the valve-guide 24 functions not only as a guide for the valve-member, but also to compensate for the tendency of the fluid passing through the valve to close the valve, especially during a sudden surge of pressure and volume of flow. The valve-guide 24, therefore, shields the valve-closing member in the manner disclosed and claimed in my co-pending application, Serial No. 195,613 mentioned hereinbefore.

While the foregoing description of the actuating magnets employed in accordance with the present invention specifically refers for illustrative purposes to an annular or ring magnet 52, it will be understood that a number of individual bar magnets could be used in place of the annular magnet. The individual magnets would of course be disposed in a ring corresponding to the annular magnet 52. Furthermore, a ring magnet could be used in place of the bar magnet 50. In another arrangement of the actuating magnets the poles of the magnet 52 could be disposed radially of the longitudinal axis of the valve. In that event the magnet 50 would be magnetized so as to have like poles at both ends and its opposite pole in the center, the central pole being of like polarity to the inner pole of the magnet 52 so that the magnet 50 is repelled in both directions from the central plane in which the annular magnet 52 lies.

Similarly, it will also be appreciated that the invention is not necessarily limited to float valves, as it is possible to employ any other means for moving the driving magnet, such as pressure-responsive device. These and other

What is claimed is:

1. A magnetically operated valve comprising in combination a valve seat and a valve-closing member guided for reciprocal movement into and out of closing relation with said valve seat along a limited path of movement, means defining the limits of movement of said valve-closing member, a driven magnet carried by said valve-closing member, magnetic driving means movably mounted relative to and encompassing said driven magnet for limited movement co-axially of said valve-closing member, stop-means locating the limits of movement of said magnetic driving means outwardly of the corresponding limits of movement of said driven magnet, the poles of said driven magnet and magnetic driving means being disposed such that said driven magnet is repelled by said magnetic driving means in one direction when said magnetic driving means is at one of its limits of movement and in the opposite direction when said magnetic driving means is at its other limit of movement, and means for moving said magnetic driving means to its limits of movement.

2. A magnetically operated valve as defined in claim 1, wherein said magnetic driving means comprises an annular magnet and the magnetic axes of said magnets are co-axial with the path of movement of said valve-closing member with their poles disposed in the same directions.

3. A magnetically operated valve as defined in claim 1, wherein said means for moving said magnetic driving means comprises a float member responsive to a liquid level, said float member being supported on said valve for movement along said path of movement of said valve-closing member and said magnetic driving means being carried by said float member.

4. A magnetically operated valve as defined in claim 1, wherein said magnetic driving means comprises an annular magnet and the magnetic axes of said magnets are co-axial with the path of movement of said valve-closing member with their poles disposed in the same directions, said means for moving said magnetic driving means comprising a float member responsive to a liquid level, said float member being supported on said valve for movement along said path of movement of said valve-closing member, and said annular magnet being carried by said float member.

5. A magnetically operated valve as defined in claim 1, which further includes a valve-guide having a socket extending axially of said valve-closing member into which said valve-closing member moves upon moving out of closing relation with said valve seat, said socket being slightly larger in cross-section than said valve-closing member for permitting the flow of fluid into and out of said socket as said valve-closing member moves into and out of its closing position, said valve-guide shielding said valve-closing member in its open position against the flow of fluid through said valve tending to move said valve-closing member against the urge of said magnetic driving means.

References Cited by the Examiner
UNITED STATES PATENTS

| | | | |
|---|---|---|---|
| 2,999,509 | 9/1961 | Hankison et al. | 137—416 X |
| 3,105,512 | 10/1963 | Lyall et al. | 137—416 |

References Cited by the Applicant
UNITED STATES PATENTS

| | | |
|---|---|---|
| 2,405,127 | 8/1946 | Beach. |
| 2,609,669 | 9/1952 | Eddy. |
| 2,637,343 | 5/1953 | Matthews. |
| 2,869,563 | 1/1959 | Schoengrun. |
| 2,893,427 | 7/1959 | Felgate. |

MARTIN P. SCHWADRON, *Acting Primary Examiner.*